United States Patent
Xiong et al.

(10) Patent No.: US 11,667,214 B2
(45) Date of Patent: Jun. 6, 2023

(54) VIRTUAL CO-PHASE POWER SUPPLY SYSTEM TOPOLOGY SUITABLE FOR ELECTRICAL SECTIONING DEVICE AT SECTIONING AND PARALLELING POST

(71) Applicant: Southwest Jiaotong University, Chengdu (CN)

(72) Inventors: Chenglin Xiong, Chengdu (CN); Rong Mei, Chengdu (CN); Shuang Song, Chengdu (CN); Zhiwei Song, Chengdu (CN); Lu Huang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 378 days.

(21) Appl. No.: 17/020,843

(22) Filed: Sep. 15, 2020

(65) Prior Publication Data
US 2021/0276456 A1   Sep. 9, 2021

(30) Foreign Application Priority Data

Mar. 9, 2020   (CN) .......................... 202010158233.X

(51) Int. Cl.
*B60M 3/04*   (2006.01)
(52) U.S. Cl.
CPC ..................................... *B60M 3/04* (2013.01)

(58) Field of Classification Search
CPC . B60M 1/02; B60M 1/08; B60M 3/00; B60M 3/02; B60M 3/04; B60M 3/06; B60M 7/00
See application file for complete search history.

(56) References Cited

FOREIGN PATENT DOCUMENTS

| CN | 103818271 A | * | 5/2014 | ............ B60M 3/04 |
| CN | 103818271 A |   | 5/2014 | |

* cited by examiner

*Primary Examiner* — Robert J McCarry, Jr.
(74) *Attorney, Agent, or Firm* — Bayramoglu Law Offices LLC

(57) ABSTRACT

A virtual co-phase power supply system topology suitable for an electrical sectioning device at a sectioning and paralleling post (SP) includes a step-down transformer $TR_1$. A primary winding of the step-down transformer $TR_1$ is electrically connected to a traction feeding section $\beta_2$ in a train from a traction feeding section $\beta_1$ to the traction feeding section $\beta_2$. Each secondary winding is electrically connected to one rectifier separately. DC buses output from the rectifiers are connected in parallel. The other end of the DC bus is electrically connected to a plurality of parallel inverter units. An LC filter is provided on a DC bus between a rectifier unit and the inverter unit, and the LC filter is connected in parallel to an energy storage unit. After filtering through the LC filter, an output end of the inverter unit is electrically connected to a primary winding of a step-up transformer $TR_2$.

9 Claims, 5 Drawing Sheets

--Prior Art--

--Prior Art--

--Prior Art--

VIRTUAL CO-PHASE POWER SUPPLY SYSTEM TOPOLOGY SUITABLE FOR ELECTRICAL SECTIONING DEVICE AT SECTIONING AND PARALLELING POST

CROSS REFERENCE TO THE RELATED APPLICATIONS

This application is based upon and claims priority to Chinese Patent Application No. 202010158233.X, filed on Mar. 9, 2020, the entire contents of which are incorporated herein by reference.

TECHNICAL FIELD

The present invention relates to the technical field of railway traction power supply, and specifically, to a virtual co-phase power supply system topology suitable for an electrical sectioning device at a sectioning and paralleling post (SP).

BACKGROUND

Electric locomotives, such as electric multiple units (EMUs), can pass neutral sections in several ways. In the early stage, train speed is slow, and usually a neutral section is manually operated by drivers according to neutral section markers set at the neutral section. Before arriving at the neutral section, however, the driver first reduces a traction level to 0, disconnects an auxiliary system, and then switches off a main circuit breaker on a primary side of a traction transformer, so that the locomotive passes the neutral section without electricity. Once the locomotive enters a power supply zone of a next-phase feeding section, the driver switches on the main circuit breaker, starts the auxiliary system, and gradually restores the traction level.

This manual mode is labor intensive. The driver must cut off power when the locomotive passes the neutral section. If the power is not cut off when the locomotive enters the neutral section, a traction network and pantograph will produce overvoltage and arcing, which may burn the traction network and pantograph or even lead to serious incidents such as two-phase short-circuit. This problem will become more prominent as the train speed continues to increase.

At present, electric locomotives usually adopt automatic neutral section passing methods, including ground neutral section auto-passing and on-board neutral section auto-passing. In ground neutral section auto-passing, no operational intervention is needed for the electric locomotive to perform, and the power-off time of a main circuit is very short. This method is suitable for areas with large slopes and large traffic.

A conventional ground neutral-section passing device uses an air circuit breaker or a power electronic switch, to enable the electric locomotive to pass the neutral section through on/off switching. However, there is a power supply dead zone in this method. FIG. 1 shows an uninterruptible neutral section passing method in the prior art. A back-to-back converter is used to supply power to the neutral section, allowing the locomotive to pass the neutral section without power interruption. Patent document ZL 201410036222.9 provides a multi-level cascaded ground neutral-section passing system based on a power electronic device. The system topology is shown in FIG. 2. A combined co-phase power supply system is also disclosed. As shown in FIG. 3, a converter and a transformer are jointly used to further reduce the system capacity while ensuring that a locomotive passes a neutral section without power interruption. All of these systems, however, require large capacity but deliver low reliability.

SUMMARY

In view of the disadvantages in the prior art, the present invention provides a virtual co-phase power supply system topology suitable for an electrical sectioning device at an SP, to solve the problem that current power supply systems in the prior art have poor reliability.

To solve the above technical problems, the technical solution adopted by the present invention is as follows.

A virtual co-phase power supply system topology suitable for an electrical sectioning device at an SP is provided, including a step-down transformer $TR_1$. In a train system from a first traction feeding section $\beta_1$ to a second traction feeding section $\beta_2$, a primary winding of the step-down transformer $TR_1$ is electrically connected to the second traction feeding section $\beta_2$. Each secondary winding of the step-down transformer $TR_1$ is electrically connected to a rectifier separately. The rectifiers are connected in parallel through DC buses. The other end is electrically connected to a plurality of parallel inverter units. An LC filter is provided on a DC bus between a rectifier unit and the inverter unit, and the LC filter is connected in parallel to an energy storage unit. After filtering through the filter, an output end of the inverter unit is electrically connected to a primary winding of a step-up transformer $TR_2$, and one end of a secondary winding of the step-up transformer $TR_2$ is electrically connected to the first traction feeding section $\beta_1$. The other end of the secondary winding of the step-up transformer $TR_2$ is electrically connected to a neutral section.

The rectifier units and inverter units are connected in parallel, making them independent of each other. A damaged unit can be easily removed and replaced to ensure the reliability. The energy storage units are configured to form an intermediate DC unit, enabling a rectifier side to continuously work with a low capacity and an inverter side to intermittently work with a large capacity. In this way, the present invention can properly meet the characteristics of a virtual co-phase power supply system and reduce the system capacity.

In the foregoing solution, preferably, the secondary winding of the step-up transformer $TR_2$ is electrically connected to the first traction feeding section $\beta_1$, and the other end of the step-up transformer $TR_2$ is electrically connected to the neutral section.

The secondary winding of the step-up transformer is connected to the neutral section, so that the energy of the DC bus is inverted, filtered, and boosted before being supplied to the neutral section.

In the foregoing solution, preferably, the energy storage unit includes a support capacitor C that is connected in parallel to the LC filter.

The support capacitor is configured to support real-time charging and discharging, to ensure that the rectifier side of the power supply system can continuously work. The LC filter is configured to filter out frequency-doubling harmonic.

In the foregoing solution, preferably, the energy storage unit includes battery modules connected in parallel between the DC buses.

The battery modules are configured to absorb electric energy of the second traction feeding section $\beta_2$ and supply power to the neutral section.

In the foregoing solution, preferably, the rectifier units are a plurality of H-bridge rectifiers connected in parallel to each other, and the output DC buses thereof are connected in parallel.

The plurality of parallel rectifiers are configured to meet the system capacity requirements. The H-bridge rectifiers are independent of each other, so that a damaged unit can be easily removed and replaced.

In the foregoing solution, preferably, the inverter units are a plurality of H-bridge inverters connected in parallel to each other.

The plurality of parallel inverters are configured to meet the system capacity requirements. The H-bridge inverters are independent of each other, so that a damaged unit can be easily removed and replaced.

In the foregoing solution, preferably, both the step-up transformer and the step-down transformer are fixed-capacity transformers selected according to a required maximum capacity.

Both the step-up transformer and the step-down transformer are set to fixed-capacity transformers, so that working capacities of the rectifier side and the inverter side of the power supply system are different, enabling the rectifier side to continuously work with a low capacity and the inverter side to intermittently work with a large capacity. In this way, the present invention can properly meet the characteristics of the virtual co-phase power supply system and reduce the system capacity.

In the foregoing solution, preferably, a capacity of the inverter unit is at least the product of a voltage difference between two adjacent traction feeding sections and the required load current.

The capacity of the inverter unit is set to be matched with the voltage difference between the adjacent traction feeding sections, so that the inverter side can intermittently work with large capacity.

In the foregoing solution, preferably, a capacity of the rectifier unit is not less than a capacity required to fully charge the energy storage unit within an interval between two adjacent trains.

The capacity of the rectifier unit is set to be matched with the capacity required by the train, so that the energy storage unit can be charged in time to ensure uninterrupted power supply to the train.

In the foregoing solution, preferably, a capacity of the energy storage unit is not less than a capacity required by the train to pass the power supply system once.

The capacity of the energy storage unit is set to be matched with the capacity required by the train, to ensure uninterrupted power supply to the train.

Advantages of the virtual co-phase power supply system topology suitable for an electrical sectioning device at an SP according to the present invention are as follows.

According to the present invention, the rectifier units and inverter units are connected in parallel, making them independent of each other. A damaged unit can be easily removed and replaced to ensure the reliability. The energy storage units are configured to form the intermediate DC unit, enabling the rectifier side to continuously work with a low capacity and the inverter side to intermittently work with a large capacity. In this way, the present invention can properly meet the characteristics of the virtual co-phase power supply system and reduce the system capacity.

The parallel rectifier units and inverter units can improve the system reliability and reduce the system capacity, better meeting the requirements of the virtual co-phase power supply system.

DETAILED DESCRIPTION OF THE EMBODIMENTS

The present invention will be explained in detail with reference to the accompanying drawings.

Figure 1:
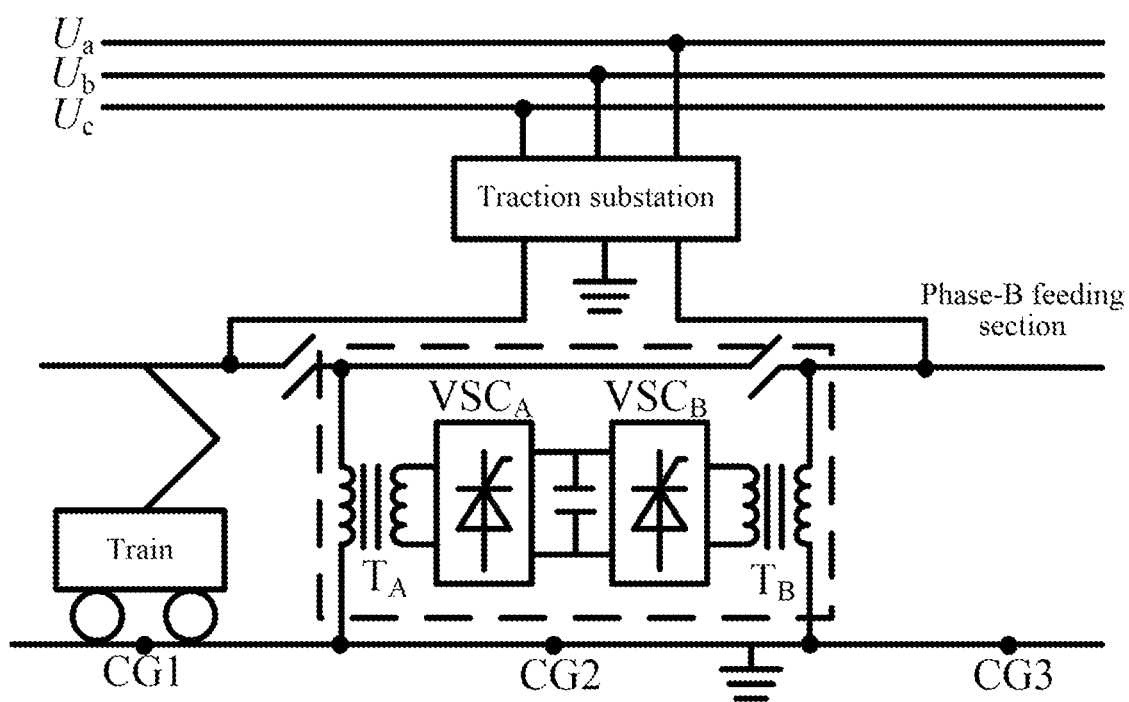
FIG. 1 is a structure diagram of an uninterruptible power supply neutral section system of the back-to-back converter type in the prior art.
Figure 2:
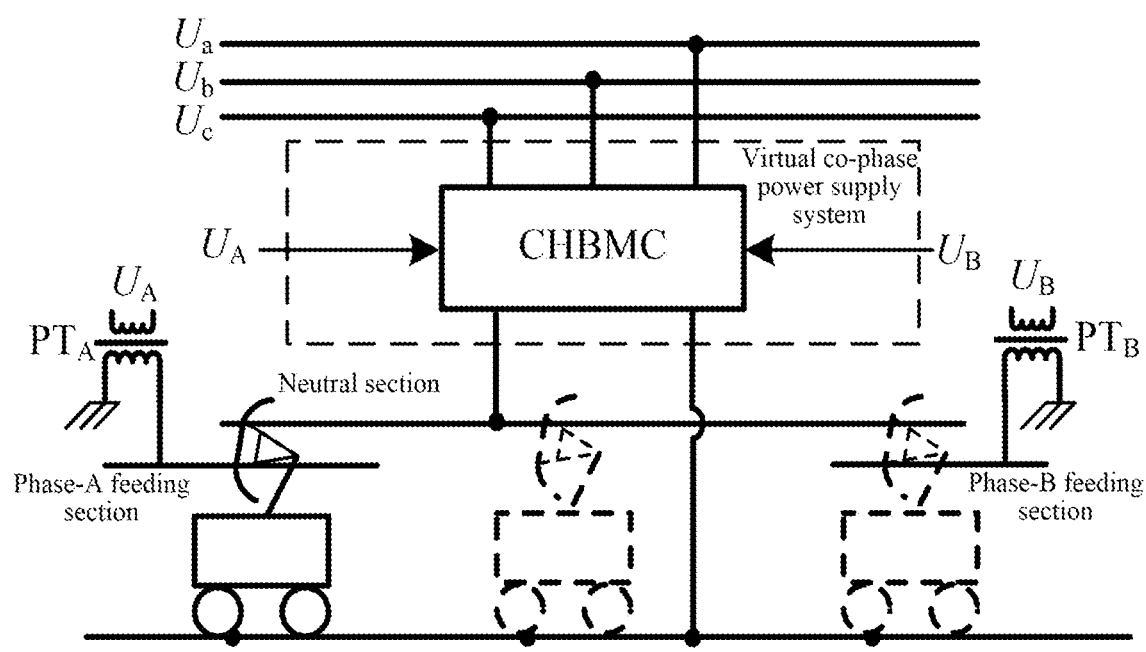
FIG. 2 is a system structure diagram of a multi-level cascaded ground neutral-section passing device in the prior art.
Figure 3:
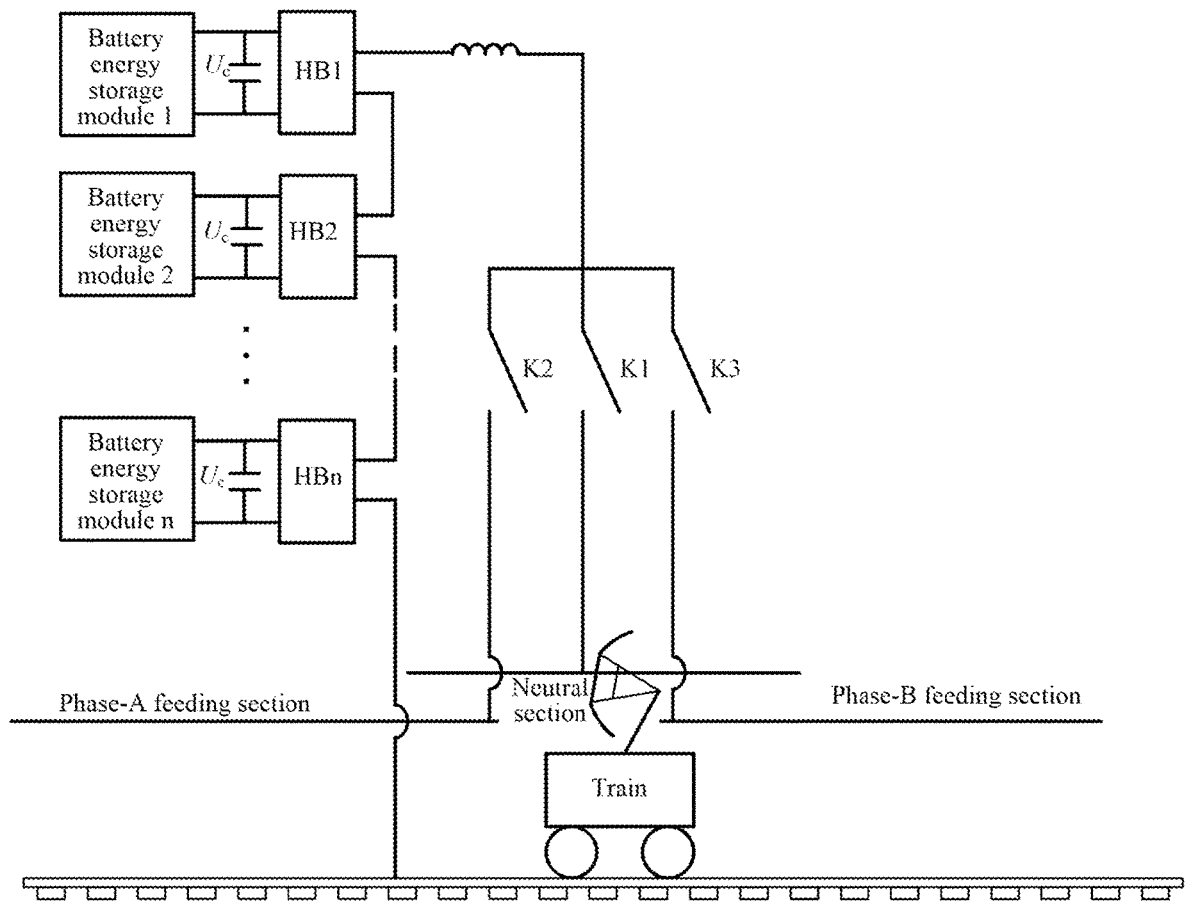
FIG. 3 is a system structure diagram of a multi-level cascaded ground neutral-section passing device of a battery energy storage in the prior art.
Figure 4:
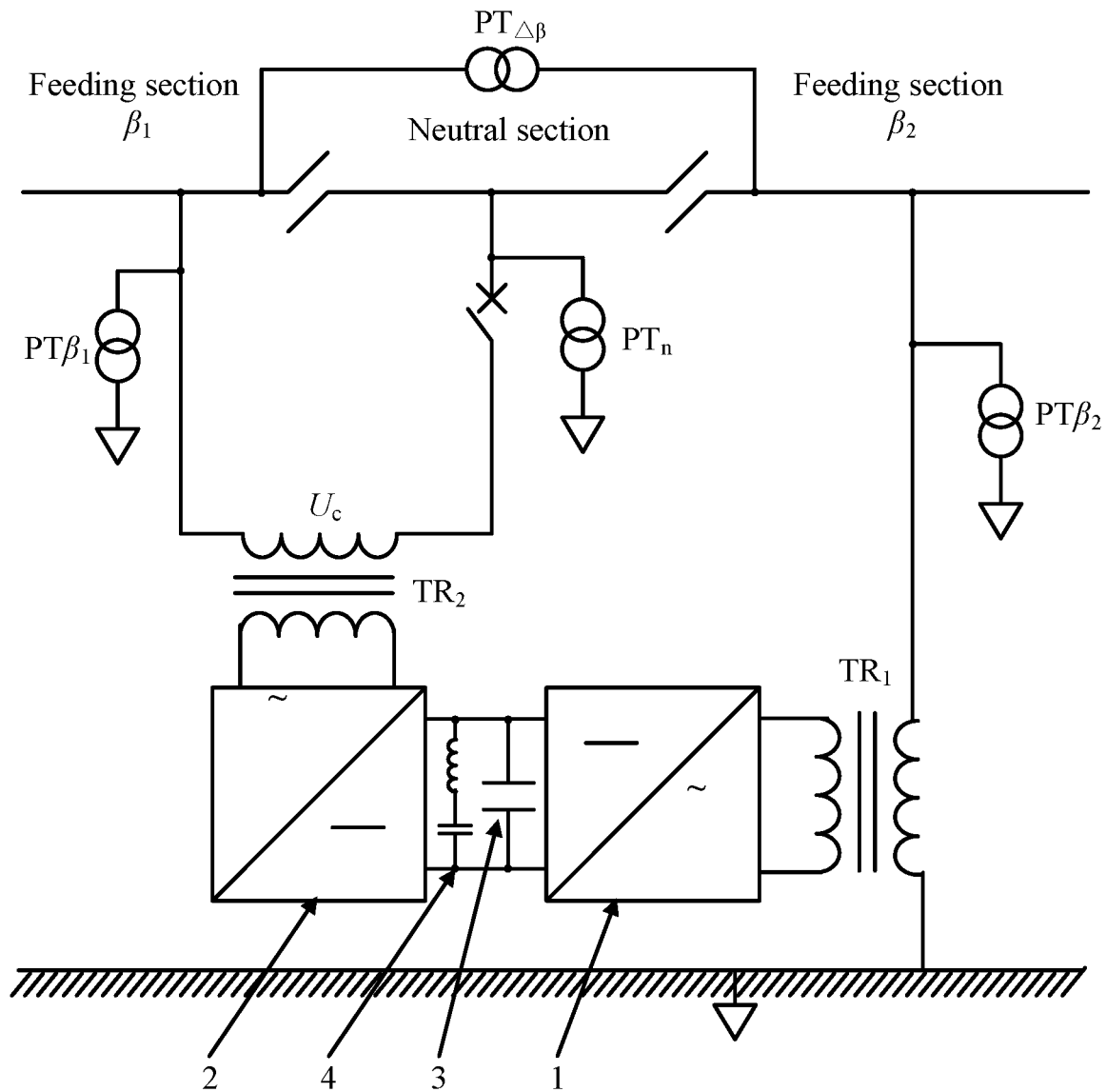
FIG. 4 is a diagram of an overall topology of a power supply system according to the present invention.

FIG. 4 shows a flow chart of a virtual co-phase power supply system topology suitable for an electrical sectioning device at an SP.

The virtual co-phase power supply system topology suitable for an electrical sectioning device at an SP according to the present invention includes a step-down transformer $TR_1$. A primary winding of the step-down transformer $TR_1$ is electrically connected to a traction feeding section $\beta_2$ in a train system from a traction feeding section $\beta_1$ to the traction feeding section $\beta_2$. Each secondary winding of the step-down transformer $TR_1$ is electrically connected to one rectifier unit 1 separately. Output DC ends of rectifier units 1 are connected in parallel through DC buses 4, the other end of the DC bus 4 is electrically connected to a plurality of parallel inverter units 2. An LC filter is provided on a DC bus between the rectifier unit 1 and the inverter unit 2, and the LC filter is connected in parallel to the energy storage unit 3. After filtering through the LC filter, an output end of the inverter unit 2 is electrically connected to a primary winding of a step-up transformer $TR_2$, and a secondary winding of the step-up transformer $TR_2$ is electrically connected to the traction feeding section $\beta_1$, and the other end of the step-up transformer $TR_2$ is electrically connected to a neutral section.

The rectifier units 1 and the inverter units 2 are connected in parallel, making them independent of each other. A damaged unit can be easily removed and replaced to ensure the reliability. The energy storage units 3 are configured to form an intermediate DC unit, enabling a rectifier side to continuously work with a low capacity and an inverter side to intermittently work with a large capacity. In this way, the present invention can properly meet the characteristics of a virtual co-phase power supply system and reduce the system capacity.

The secondary winding of the step-up transformer is connected to the neutral section, so that the energy of the DC bus 4 is inverted, filtered, and boosted before being supplied to the neutral section.

The energy storage unit 3 includes a support capacitor C that is connected in parallel to the LC filter. The support capacitor is configured to support real-time charging and discharging, to ensure that the rectifier side of the power supply system can continuously work. The LC filter is configured to filter out frequency-doubling harmonic.

The energy storage unit 3 includes battery modules connected in parallel between the DC buses 4. The battery modules are configured to absorb electric energy of the traction feeding section $\beta_2$ and supply power to the neutral section.

Figure 5:
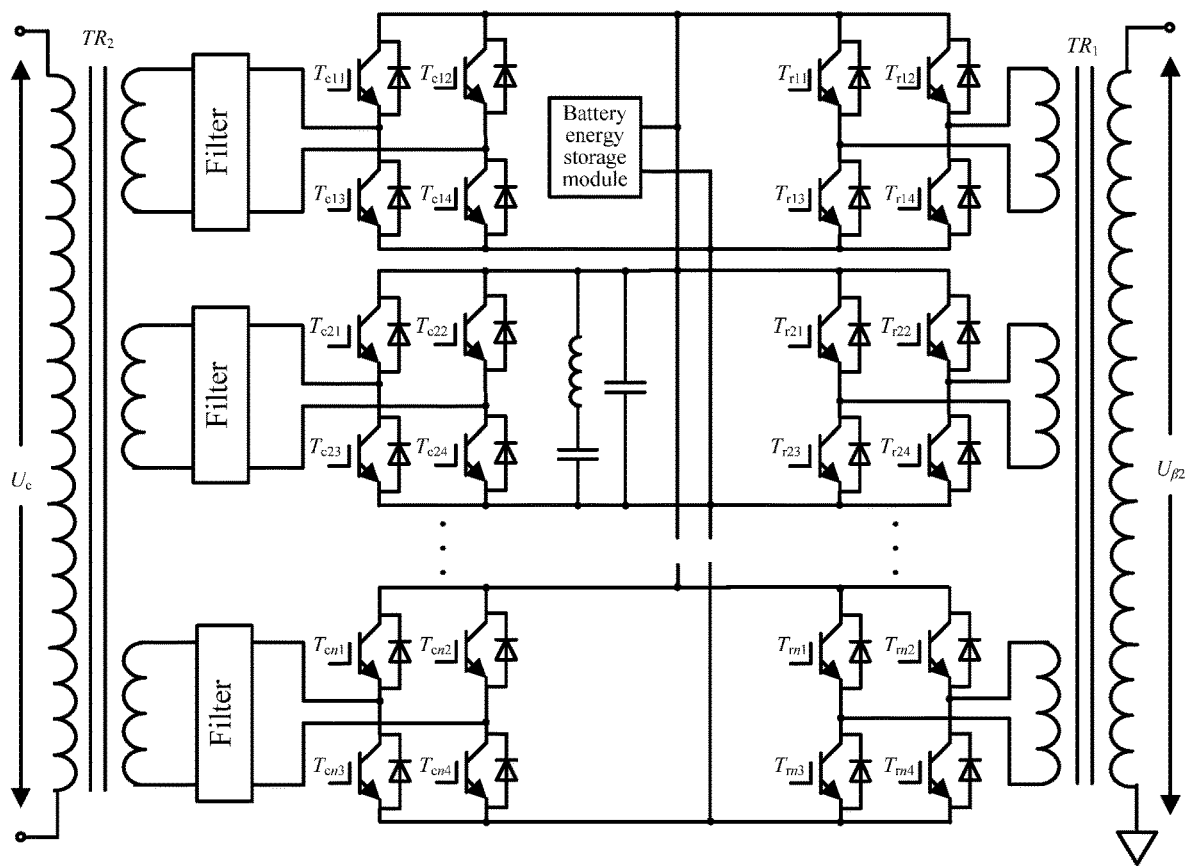
FIG. 5 is a topology diagram of a converter corresponding to the embodiment in FIG. 4 schematically showing the rectifier unit 1, the inverter unit 2, the energy storage unit 3, and the DC bus 4.

Specifically, as shown in FIG. 5, the rectifier units 1 are a plurality of H-bridge rectifiers connected in parallel to each other. The plurality of parallel rectifiers are configured to meet the system capacity requirements. The H-bridge rectifiers are independent of each other, so that a damaged unit can be easily removed and replaced.

The inverter units 2 are a plurality of H-bridge inverters connected in parallel. The plurality of parallel inverters are configured to meet the system capacity requirements. The H-bridge inverters are independent of each other, so that a damaged unit can be easily removed and replaced.

Preferably, both the step-up transformer and the step-down transformer are fixed-capacity transformers selected according to a required maximum capacity. The working capacities of the rectifier side and the inverter side of the power supply system are different, so that the rectifier side can continuously work with a low capacity and the inverter side can intermittently work with a large capacity. In this way, the present invention can properly meet the characteristics of the virtual co-phase power supply system and reduce the system capacity.

Preferably, a capacity of the inverter unit 2 is at least the product of a voltage difference between two adjacent traction feeding sections and the required load current, and a quantity of inverter units 2 is obtained by dividing a total capacity by a capacity of a single module. This allows the inverter side to intermittently work with large capacity.

A capacity of the rectifier unit 1 is not less than a capacity required to fully charge the energy storage unit 3 within an interval between two adjacent trains, so that the rectifier unit 1 can fully charge the intermediate energy storage unit 3 within one interval. A quantity of the rectifier units 1 is obtained by dividing a capacity of the rectifier side by a capacity of a single rectifier module 1, so that the energy storage unit 3 can be charged in time to ensure uninterrupted power supply to the train.

A capacity of the energy storage unit 3 is not less than a capacity required by the train to pass the power supply system once, and is determined by the time required by the train to pass the neutral section, so that power can be supplied to the train without interruption. In this case, voltage of the energy storage unit 3 is equal to voltage between the DC buses 4.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes or devices, and any further applications of the principles of the invention as described herein, are contemplated as would normally occur to one skilled in the art to which the invention pertains.

What is claimed is:

1. A virtual co-phase power supply system topology suitable for an electrical sectioning device at a sectioning and paralleling post (SP) of a train system comprising a step-down transformer $TR_1$ for transferring energy to the electrical sectioning device, wherein the SP of the train system comprises a neutral section between a first traction feeding section $\beta_1$ and a second traction feeding section $\beta_2$ for a train to pass from the first traction feeding section to the second traction feeding section $\beta_2$ through the neutral section, a primary winding of the step-down transformer $TR_1$ is electrically connected to the second traction feeding section $\beta_2$, each secondary winding of the step-down transformer $TR_1$ is electrically connected to a rectifier unit of a plurality of rectifier units separately, the plurality of rectifier units are connected in parallel through DC buses, an end of the DC buses is electrically connected to a plurality of parallel inverter units, an LC filter is provided on the DC buses between the plurality of parallel rectifier units and the plurality of parallel inverter units for filtering energy from the DC buses to produce filtered energy, the LC filter is connected in parallel to an energy storage unit;

an output end of the inverter unit is electrically connected to a primary winding of a step-up transformer $TR_2$, the inverter unit being configured to invert the filtered energy to produce inverted energy, a first end of a secondary winding of the step-up transformer $TR_2$ is electrically connected to the first traction feeding section $\beta_1$, and a second end of the secondary winding of the step-up transformer $TR_2$ is electrically connected to a neutral section for receiving the inverted energy.

2. The virtual co-phase power supply system topology suitable for the electrical sectioning device at the SP according to claim 1, wherein the energy storage unit comprises a support capacitor C, and the support capacitor C is connected in parallel to the LC filter.

3. The virtual co-phase power supply system topology suitable for the electrical sectioning device at the SP according to claim 2, wherein the energy storage unit comprises a battery module connected in parallel between the DC buses.

4. The virtual co-phase power supply system topology suitable for the electrical sectioning device at the SP according to claim 1, wherein the plurality of rectifier units are a plurality of first H-bridge rectifiers connected in parallel to each other, and the DC buses of the plurality of H-bridge rectifiers are connected in parallel.

5. The virtual co-phase power supply system topology suitable for the electrical sectioning device at the SP according to claim 4, wherein the plurality of parallel inverter units are a plurality of second H-bridge inverters connected in parallel to each other.

6. The virtual co-phase power supply system topology suitable for the electrical sectioning device at the SP according to claim 1, wherein both the step-up transformer and the step-down transformer are fixed-capacity transformers selected according to a required maximum capacity.

7. The virtual co-phase power supply system topology suitable for the electrical sectioning device at the SP according to claim 1, wherein a capacity of the inverter unit is at least the product of a voltage difference between two adjacent traction feeding sections and a required load current.

8. The virtual co-phase power supply system topology suitable for the electrical sectioning device at the SP according to claim 7, wherein a capacity of the rectifier unit is not less than a capacity required to fully charge the energy storage unit within an interval between two adjacent trains.

9. The virtual co-phase power supply system topology suitable for the electrical sectioning device at the SP according to claim 8, wherein a capacity of the energy storage unit is not less than a capacity required for the train to pass a virtual co-phase power supply system once.

\* \* \* \* \*